United States Patent [19]
Inbasekaran et al.

[11] Patent Number: 5,194,562
[45] Date of Patent: Mar. 16, 1993

[54] NUCLEOPHILIC DISPLACEMENT METHOD FOR SYNTHESIS OF NON-RIGID PBZ POLYMERS

[75] Inventors: Muthiah N. Inbasekaran; Michael J. Mullins, both of Midland, Mich.

[73] Assignee: The Dow Chemical Company, Midland, Mich.

[21] Appl. No.: 819,419

[22] Filed: Jan. 10, 1992

Related U.S. Application Data

[62] Division of Ser. No. 313,936, Feb. 22, 1989, Pat. No. 5,104,960.

[51] Int. Cl.$^5$ .................. C08G 8/02; C08G 69/26; C08G 75/00; C07D 235/04
[52] U.S. Cl. .................. 528/125; 528/126; 528/128; 528/172; 528/176; 528/179; 528/183; 528/185; 528/186; 528/188; 528/226; 528/229; 528/327; 528/330; 528/331; 528/337; 528/341; 528/342; 528/344; 528/346; 528/347; 528/351; 548/156; 548/224; 548/305.4; 548/302.1; 548/310.7
[58] Field of Search .............. 528/125, 126, 128, 172, 528/185-186, 226, 229, 327, 330, 331, 337, 342, 344, 347, 348, 351, 176, 183, 188, 346, 341, 179; 548/156, 224, 328

[56] References Cited

U.S. PATENT DOCUMENTS

| | | | |
|---|---|---|---|
| 3,264,536 | 8/1966 | Robinson et al. | 361/323 |
| 3,586,670 | 6/1971 | Brenneisen et al. | 548/217 |
| 3,647,812 | 3/1972 | Smith | 548/179 |
| 3,669,979 | 6/1972 | Freyermuth | 548/179 |
| 3,706,834 | 12/1972 | Schellenbaum et al. | 514/375 |
| 3,761,447 | 9/1973 | Blaise et al. | 528/172 |
| 4,025,636 | 5/1977 | Dunwell et al. | 514/382 |
| 4,065,437 | 12/1977 | Blinne et al. | 528/125 |
| 4,123,435 | 10/1978 | Grinstead et al. | 548/224 |
| 4,174,321 | 11/1979 | Wang et al. | 548/219 |
| 4,229,566 | 10/1980 | Evers et al. | 528/185 |
| 4,232,142 | 11/1980 | Barr et al. | 528/125 |
| 4,359,567 | 11/1982 | Evers | 528/179 |
| 4,474,932 | 10/1984 | Bier et al. | 528/125 |
| 4,505,842 | 3/1985 | Kurkov | 528/183 |
| 4,505,843 | 3/1985 | Suzuki et al. | 528/183 |
| 4,533,692 | 8/1985 | Wolfe et al. | 528/183 |
| 4,533,693 | 8/1985 | Wolfe et al. | 524/417 |
| 4,550,140 | 10/1985 | Rimsa et al. | 525/132 |
| 4,578,432 | 3/1986 | Tsai et al. | 528/179 |
| 4,594,426 | 6/1986 | Fujita et al. | 548/217 |
| 4,703,103 | 10/1987 | Wolfe et al. | 528/183 |
| 4,771,945 | 12/1987 | Daniels | 239/13 |
| 4,794,155 | 12/1988 | Woo et al. | 528/125 |
| 4,816,554 | 3/1989 | Katritzksy et al. | 528/210 |
| 5,064,929 | 11/1991 | Kumpf et al. | 528/172 |

FOREIGN PATENT DOCUMENTS

| | | |
|---|---|---|
| 2067512 | 7/1971 | France . |
| 287947 | 5/1971 | U.S.S.R. . |

OTHER PUBLICATIONS

Hedrick et al., "Synthesis of Imide-Aryl Ether Benzoxazole Random Copolymers," *Polymer Preprints* 265-66 (1989).

Henrich, "Beiträge zur Kenntniss des Zusammenhangszwischen Fluorescenz und chemischer Constitution bei Derivaten des Benzoxazols," 37 *Chem. Berichte* 3108 (1904).

Sadasivashankar et al., "Antifungal and Antibacterial Activity of Some Substituted Benzoxazoles," 37(2) *Indian Phytophathol.* 366 (1985).

Shankar et al., "Synthesis of 6-pyrazozo- and 6-isoxazolobenzoxazoles and Their Physiological Activity," 59(9) *J. Indian Chem. Soc.* 1104 (1982).

Kao Chen-Heng et al., "a Study of 2,6-Disubstituted Benzobisoxazoles," 1 *Chemical Journal of Chinese Universities* 61-65 (1980).

Evers et al., "Articulates All-Para Polymers with 2,6--Benzobisoxazole, 2,6-Benzobisthiazole, and 2,6-Benzobisimidazole Units in the Backbone," 14 *Macromolecules* 925 (1981).

*Primary Examiner*—John Kight, III
*Assistant Examiner*—P. Hampton-Hightower

[57] ABSTRACT

Azole rings, such as oxazole and thiazole rings, can activate an aromatic ring bonded to a leaving group such as a halogen atom so that the aromatic ring will undergo aromatic nucleophilic substitution. The reaction is useful for making ethers, thioethers and amines containing azole rings. In particular, monomers having azole rings, activated aromatic rings with leaving groups and nucleophilic moieties can react under conditions of aromatic nucleophilic displacement to form non-rigid rob PBZ polymers. The non-rigid rod PBZ polymers can be used to form molecular composites with rigid rod PBZ polymers which molecular composites are not substantially phase separated.

30 Claims, No Drawings

NUCLEOPHILIC DISPLACEMENT METHOD FOR SYNTHESIS OF NON-RIGID PBZ POLYMERS

CROSS-REFERENCE TO RELATED APPLICATION

This is a divisional of application Ser. No. 07/313,936 filed Feb. 22, 1989 now U.S. Pat. No. 5,104,960.

BACKGROUND OF THE INVENTION

The invention relates to the synthesis of polybenzoxazole (PBO), polybenzimidazole (PBI) or polybenzothiazole (PBT) and related polymers (hereinafter referred to as PBZ polymers).

PBZ polymers are a known class of polymers which contain a plurality of mer units comprising at least:
(1) a first aromatic group ($Ar^1$); and
(2) a first azole ring which is fused with the first aromatic group.

Each mer unit preferably further comprises
(3) a second azole ring which is fused with the first aromatic group, and
(4) a divalent group (DL), which is inert with respect to all reagents for making PBZ polymers under polymerization conditions, bonded by a single bond to the 2-carbon of the second azole ring.

Those mer units ordinarily comply with one of the following two formulae

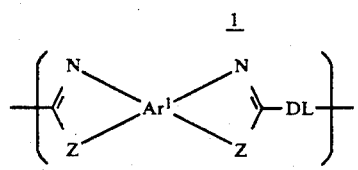

(a)

or

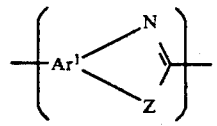

(b)

wherein:
$Ar^1$ is a first aromatic group as previously described;
DL is a divalent group as previously described; and
each Z is independently chosen from the group consisting of —O—, —S— or —NR—, wherein R is an aliphatic or aromatic group which does not interfere with polymerization.

PBZ polymers, their chemical structure, their properties and their synthesis are described in depth in numerous references such as 11 Ency. Poly, Sci & Eng., *Polybenzothiazoles and Polybenzoxazoles*, 601 (J. Wiley & Sons 1988); Wolfe et al., *Liquid Crystalline Polymer Compositions and Process and Products*, U.S. Pat. No. 4,703,103 (Oct. 27, 1987); Tsai et al., *Method for Making Heterocyclic Block Copolymer*, U.S. Pat. No. 4,578,432 (Mar. 25, 1986); Wolfe et al., *Liquid Crystalline Poly(2,6-Benzothiazole) Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985) and Wolfe et al., *Liquid Crystalline Polymer Compositions and Process and Products*, U.S. Pat. No. 4,533,692 (Aug. 6, 1985), which are incorporated herein by reference.

It is known in the art to synthesize PBZ polymers by the reaction of a first monomer comprising:
(1) a first aromatic group ($Ar^1$);
(2) a first o-amino-basic moiety bonded to said first aromatic group, which o-amino-basic moiety contains:
 (a) a primary amine group bonded to the first aromatic group; and
 (b) a hydroxy, thio or amine group bonded to the first aromatic group in ortho position with respect to the primary amine group;
(3) an azole-forming group bonded to the first aromatic group which is either a second o-amino-basic group or an "electron-deficient carbon group,"
and a second monomer comprising:
(1) a divalent group which is inert with respect to all reagents under reaction conditions;
(2) an "electron-deficient carbon group," such as a carboxylic acid or acid salt; and
(3) an azole-forming group which may be a second "electron-deficient carbon group" or, if the divalent group comprises an aromatic group, an o-amino-basic group.

The known syntheses for PBZ polymers ordinarily conform to one of the following two formulae:

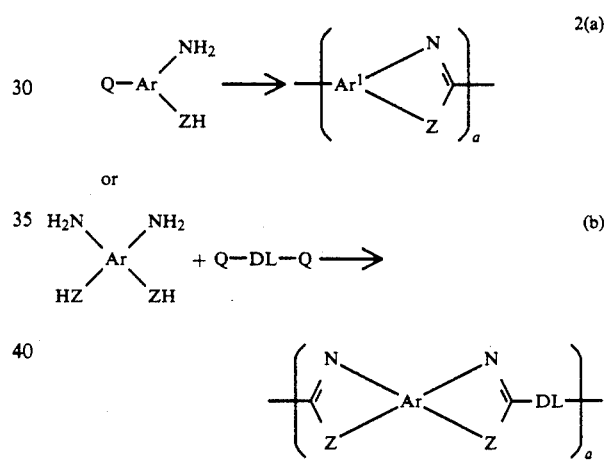

wherein:
each $Ar^1$ is a first aromatic group;
each Z is an oxygen atom, a sulfur atom or —NR—, wherein R is an aliphatic or aromatic group which does not interfere with polymerization and each Z is bonded to the first aromatic group ($Ar^1$) ortho to a primary amine group (in the monomer) or the nitrogen atom of the azole ring in which it is located (in the polymer);
DL is a divalent group as previously described; and
each Q is an electron-deficient carbon group as previously described.

Those polymerizations have a number of drawbacks. First, polymerization is ordinarily carried out in a strong mineral acid such as polyphosphoric acid or a mixture of methanesulfonic acid and phosphorus pentoxide. Such acids are difficult to work with and must be washed from the resulting polymer by time-consuming rinsing over periods as long as 24 hours or longer. Second, monomers containing the o-amino-basic group are oxidatively unstable and must be stored as hydrogen halide salts, which are converted back to the basic monomer in the polymerization vessel by a time-consuming dehydrohalogenation step. Third, in the known syntheses the concentration of solids in the reaction mixture cannot ordinarily exceed 10 to 15 percent, so that large reaction vessels are necessary to synthesize small amounts of polymer.

What are needed are alternative processes for synthesizing PBZ polymers which do not rely upon the reaction of an o-amino-basic group with an electron-deficient carbon group to link monomers and which can avoid some or all of the drawbacks of the prior art processes.

SUMMARY OF THE INVENTION

The first aspect of the present invention is a process for synthesizing a di-aromatic ether, thioether or amine wherein one aromatic group is bonded to an azole ring, said process comprising the step of contacting:
(1) an azole-containing compound having:
  (a) an azole ring;
  (b) an aromatic group bonded to the 2-carbon of said azole ring; and
  (c) a leaving group bonded to said aromatic group in a position such that it is activated by said azole ring,
and
(2) a displacing compound having:
  (a) an organic moiety which is not electron-withdrawing and which is inert with respect to all reagents under reaction conditions;
  (b) a nucleophilic moiety linked to said organic moiety, which nucleophilic moiety is a nitrogen atom having a hydrogen atom or inert organic substituent or an oxygen atom or a sulfur atom; and
  (c) a counter-moiety bonded to said nucleophilic moiety which can easily be removed therefrom.

under conditions such that the counter-moiety is removed from the nucleophilic moiety and an ether, thioether or amine linkage is formed between the aromatic group of the azole-containing compound and the organic moiety of the displacing compound. The process of the present invention is useful to make compounds having two aromatic groups, one of which is bonded to an azole ring, linked by an ether, thioether or amine group. Such compounds are useful as lubricants, antioxidants and optical brighteners.

A second aspect of the present invention is a process for synthesizing non-rigid-rod PBZ polymer comprising polymerizing, under conditions suitable for nucleophilic substitution reactions, one or more difunctional monomers, each said monomer independently containing:
(1) an organic moiety which is inert with respect to all reagents under reaction conditions; and
(2) two reactive groups selected, such that a polymer is formed, from the class consisting of:
  (a) azole-containing groups having: an azole ring bonded to said organic moiety, an aromatic group bonded to the 2-carbon of said azole ring, and a leaving group bonded to said aromatic ring in a position where it is activated by said azole ring; and
  (b) displacing groups having: a nucleophilic moiety, which is an oxygen atom, a sulfur atom or a nitrogen atom, bonded to said organic moiety; and a counter-moiety bonded to said nucleophilic moiety,
whereby a non-rigid-rod PBZ polymer is formed.

A third aspect of the present invention is a compound comprising:
(1) a first aromatic group;
(2) an azole ring fused to said first aromatic group;
(3) a second aromatic group bonded to the 2-carbon of said azole ring;
(4) a leaving group bonded to said second aromatic group in a position where it is activated by said azole ring;
(5) a nucleophilic moiety, as previously defined, linked to said first aromatic group in a position not ortho to the 4- or 5-carbon of the azole ring; and
(6) a counter-moiety, as previously defined, bonded to said nucleophilic moiety.

These compounds are useful AB-monomers in a process to synthesize PBZ polymers.

A fourth aspect of the present invention is a compound comprising:
(1) an unfused first aromatic group ($Ar^1$), which comprises two aromatic moieties ($Ar^{1a}$ and $Ar^{1b}$) linked by a bond or a divalent linking moiety (D) which is inert with respect to nucleophilic aromatic substitution;
(2) a first azole ring fused with one aromatic moiety ($Ar^{1a}$) of said unfused first aromatic group, and a second azole ring fused with the other aromatic moiety ($Ar^{1b}$) of said unfused first aromatic group;
(3) a second aromatic group ($Ar^2$) bonded to the 2-carbon of said first azole ring and a third aromatic group ($Ar^3$) bonded to the 2-carbon of said second azole ring; and
(4) a first leaving group bonded to said second aromatic group and a second leaving group bonded to said third aromatic group.

Those compounds are useful AA-monomers in a process to synthesize PBZ polymers.

A fifth aspect of the present invention is a PBZ polymer synthesized by the polymerization process previously described. PBZ polymers of the present invention can be formed into useful objects by known processes. PBZ polymers of the present invention show thermal stability superior to that of related PBZ polymers synthesized by conventional processes.

A sixth aspect of the present invention is a thermoplastic PBZ polymer comprising a plurality of repeating units which contain:
(1) a first aromatic group;
(2) an azole ring fused to said first aromatic group;
(3) a second aromatic group bonded to the 2-carbon of said azole ring; and
(4) an oxygen, sulfur or nitrogen atom linked to said first aromatic group and bonded by a single bond to a second aromatic group of an adjacent unit.

Polymers of the present invention are thermoplastic and can be molded to form useful objects according to known methods.

A seventh aspect of the present invention is a molecular composite comprising a first polymer which is a rigid rod PBZ polymer and a second polymer having a plurality of repeating units which contain:
(1) a first aromatic group;
(2) an azole ring fused to said first aromatic group;
(3) a second aromatic group bonded to the 2-carbon of said azole ring; and
(4) an oxygen, sulfur or nitrogen atom linked to said first aromatic group and bonded by a single bond to a second aromatic group of an adjacent unit.

Molecular composites of the present invention can be shaped to form useful shaped articles, such as fibers and films, according to known methods.

DETAILED DESCRIPTION OF THE INVENTION

DEFINITIONS

The following terms, which are used repeatedly throughout this application, have the meanings and preferred embodiments set out hereinafter unless further limited in the Specification.

o-Amino-basic moiety—a moiety bonded to an aromatic group, which o-amino-basic moiety contains
(1) a first primary amine group bonded to the aromatic group and
(2) a hydroxy, thiol or secondary amine group bonded to the aromatic group ortho to said primary amine group.

It preferably comprises a hydroxy or thiol moiety, and most preferably comprises a hydroxy moiety. If the o-amino-basic moiety contains a secondary amine group, the organic substituent on the amine nitrogen may comprise an aromatic or an aliphatic group but preferably comprises an alkyl group. The organic substituent preferably comprises no more than about 6 carbon atoms, more preferably no more than about 4 carbon atoms and most preferably no more than about 1 carbon atoms.

Aromatic group (Ar)—any aromatic ring, fused ring system or unfused ring system. Each aromatic group may independently be heterocyclic but is preferably carbocyclic and more preferably hydrocarbyl. Each heterocyclic aromatic group is preferably a nitrogen-containing heterocycle.

Each aromatic group may be bonded to substituents which are stable in mineral acid, such as halogens, phenylsulfone moieties, alkoxy moieties, aryloxy moieties or alkyl groups. Each aromatic group is preferably bonded to no substituents other than those specified hereinafter. Organic substituents on aromatic groups preferably comprise no more than about 6 carbon atoms.

Size is not critical as long as the aromatic group is not so big that it prevents further reactions of the moiety in which it is incorporated. Fused aromatic groups preferably comprise no more than about 10 carbon atoms, not including any organic substituent on the aromatic group.

Unfused aromatic groups comprise two aromatic moieties joined by bond or a divalent linking moiety (D) which is inert with respect to all reagents under reaction conditions. Each aromatic moiety preferably comprises no more than about 10 carbon atoms and more preferably no more than about 6 carbon atoms. The divalent linking moiety preferably comprises no more than about 12 carbon atoms and more preferably no more than about 8 carbon atoms. The divalent linking moiety may comprise, for instance, a sulfonyl group; a carbonyl group; an oxygen atom; a sulfur atom; or an alkyl group, a halogenated alkyl group or a third aromatic moiety linked to the other two by sulfonyl groups, carbonyl groups or oxygen atoms. Moieties within the divalent linking moiety are preferably chosen from the group consisting of sulfonyl groups, carbonyl groups, oxygen atoms and aromatic groups. Examples of unfused aromatic groups include a biphenyl group, a diphenylketone group, a diphenylsulfone group, a diphenyl ether group, a diphenoxybenzene group, a dibenzoylbenzene group, a diphenyl alkylene group, or a dibenzoylalkylene group.

Except as specifically directed hereinafter, each aromatic group is preferably a single ring comprising no more than about six carbon atoms, and more preferably is a mono-, di-, tri- or tetra-functional benzene ring.

Azole ring—an oxazole, thiazole or imidazole ring. The carbon atom bonded to both the nitrogen atom and the oxygen, sulfur or second nitrogen atom is the 2-carbon, as depicted in formula 3

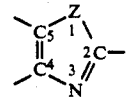

wherein Z is —O—, —S— or —NR—; and R is an aromatic or an aliphatic group and preferably an alkyl group. R preferably comprises no more than about 6 carbon atoms, more preferably no more than about 4 and most preferably no more than about 1. Each azole ring is independently preferably oxazole or thiazole and more preferably oxazole. In PBZ polymers, the 4- and 5-carbon atoms are ordinarily fused with an aromatic group.

Azole-forming moiety—an "o-amino-basic moiety" or "electron-deficient carbon group," as those terms are defined herein.

Counter-moiety (Y)—any group which can dissociate from the nucleophilic moiety (oxygen, nitrogen or sulfur atom) to which it is bonded, either by action of the solvent or by a catalyst, under reaction conditions. Examples of counter-moieties include alkali metal ions or $R_3Si$— or H—, wherein each R is independently a hydrocarbyl or substituted hydrocarbyl moiety. Each R is preferably an alkyl group, more preferably an alkyl group comprising 1 to 4 carbon atoms and most preferably a methyl group. Counter-moieties are preferably sodium, potassium or lithium ions or hydrogen atoms or trialkylsilyl moieties, and are more preferably sodium, potassium or lithium ions or trimethylsilyl moieties.

Electron-deficient carbon group (Q)—any group containing a carbon atom which can react in the mineral acid with an o-amino-basic moiety to form an azole ring, such as the groups listed in column 24, lines 59–66 of U.S. Pat. No. 4,533,693, which is incorporated herein by reference and such as a trihalomethyl group or an alkali metal carboxylate group. Preferred electron-deficient carbon groups are carboxylic acids or acid halides. Halogens in electron-deficient carbon groups are preferably chlorine, bromine or fluorine and are more preferably chlorine.

Leaving group (L)—any group capable of being displaced by the anion of a nucleophilic moiety bonded to an aromatic group under reaction conditions. Leaving groups may be, for instance, a halogen atom, an alkoxy group, an aryloxy group or a nitro group. The leaving group is preferably a halogen atom or a phenoxy group. It is more preferably a chlorine or a fluorine atom and is most preferably a fluorine atom.

PBZ polymer—A polymer from the group of polybenzoxazoles and polybenzobisoxazoles (PBO), polybenzothiazoles and polybenzobisthiazoles (PBT) and polybenzimidazoles or polybenzobisimidazoles (PBI). For the purposes of this application, the term "polybenzoxazole (PBO)" refers broadly to polymers in which each unit contains an oxazole ring bonded to an aromatic group, which need not necessarily be a benzene ring. The term "polybenzoxazole (PBO)" also refers broadly to poly(phenylene-benzobisoxazole)s and other polymers wherein each unit comprises a plurality of oxazole rings fused to an aromatic group. The same understandings shall apply to the terms polybenzothiazole (PBT) and polybenzimidazole (PBI). As used in this application, the term also encompasses mixtures, copolymers and block copolymers of two or more PBZ polymers, such as mixtures of PBO, PBT and/or PBI and block or random copolymers of PBO, PBI and PBT.

Rigid Rod PBZ polymer—An "intrinsic" or "articulated" rigid rod PBZ polymer as the terms "intrinsic" and "articulated" are defined in Hwang, "Processing, Structure and Properties of Liquid Crystalline PBT Polymer," Kansai Committee of the Society of Fiber Science and Technology, Japan, Post Symposium on Formation, Structure and Properties of High Modulus and High Tenacity Fibers 23–26 Aug. 26, 1985); Evers et al., "Articulated All-Para Polymers with 2,6-Benzobisoxazole, 2,6-Benzobisthiazole, and 2,6-Benzobisimidazole Units in the Backbone," 14 Macromolecules 925 (1981); Evers, "Thermooxidatively Stable Articulated Benzobisoxazole and Benzobisthiazole Polymers," 24 J. Poly. Sci. Part A 1863 (1986) and Evers et al., *Articulated Para-Ordered Aromatic Heterocyclic Polymers Containing Diphenoxybenzene Structures*, U.S. Pat. No. 4,229,566 (Oct. 21, 1980).

Intrinsic rigid rod polymers are essentially rectilinear and have a persistence length comparable to their contour length. Articulated rigid rod polymers comprise a plurality of essentially rectilinear moieties joined by a relatively small number of non-linear moieties. Rigid rod PBZ polymers used in the present invention are preferably intrinsic rigid rod polymers. If articulated, they preferably comprise on average no more than about 1 non-linear mer unit for each 9 essentially rectilinear mer units.

Nucleophilic Substitution Process

Nucleophilic substitutions for halogens and other leaving groups on activated aromatic rings are known reactions. The activating group bonded to the aromatic ring in those known reactions is ordinarily a sulfonyl group, a carbonyl group, a sulfoxide group, a nitro group, a nitrile group or an azo group. See, e.g., Robinson et al., *Capacitor with a Polyarylenepolyether Dielectric*, U.S. Pat. No. 3,264,536 (Aug. 2, 1966); Blinne et al., *Aromatic Polyether-Sulfones*, U.S. Pat. No. 4,065,437 (Dec. 27, 1977); Barr et al., *Production of Polyarylene Ether Sulphones and Ketones*. U.S. Pat. No. 4,232,142 (Nov. 4, 1980); Bier et al., *Process for the Production of Aromatic Ethers and Aromatic Polyethers*, U.S. Pat. No. 4,474,932 (Oct. 2, 1984); Rimsa et al., *Circuit Board Substrates Prepared from Poly(aryl ether)s*, U.S. Pat. No. 4,550,140 (Oct. 29, 1985); Daniels, U.S. Pat. No. 4,771,945 (Dec. 8, 1987); and Woo et al., *Process for Forming Arylether Polymers*, U.S. Pat. No. 4,794,155 (Dec. 27, 1988), which are incorporated herein by reference.

It has surprisingly been discovered that an azole ring bonded at the 2-carbon to an aromatic group will activate a leaving group bonded to the aromatic ring sufficiently for that leaving group to be displaced in a nucleophilic substitution.

Therefore, nucleophilic substitution reactions can be practiced upon an azole-containing compound comprising:
(1) an azole ring;
(2) an aromatic group bonded to the 2-carbon of said azole ring; and
(3) a leaving group bonded to said aromatic group in a position such that it is activated by said azole ring.

Azole rings and the 2-carbon of an azole ring are previously defined. Likewise, suitable and preferred leaving groups are also previously defined.

The leaving group must be bonded to the aromatic group in a position where it is activated by the azole ring. The leaving group and the azole ring are preferably bonded to the same six-membered ring or fused ring system. The leaving group and the azole ring are more preferably bonded to the same six-membered ring. Most preferably the aromatic group is a six-membered ring. The leaving group is highly preferably bonded to the aromatic group in ortho or para position with respect to the azole ring, and is most preferably in para position with respect to the azole ring. Of course, the aromatic group should not have substituents which interfere, sterically or otherwise, with the displacement of the leaving group. Preferably, no organic substituent having a formula weight in excess of 16 is ortho to the leaving group. More preferably no substituent is ortho to the leaving group. Most preferably, the aromatic group has no substituents other than those specifically named.

The azole-containing compound can be synthesized by obvious variations of processes familiar to persons of ordinary skill in the art. For instance, they can be synthesized by substitution of reagents into processes described in Eckenstein et al., 33 Helv. Chim. Acta. 1353 (1950); Hoffman, *Imidazole and its Derivatives*, 6 The Chemistry of Heterocyclic Compounds 33–50; Wiley, *The Chemistry of Oxazoles*, 37 Chem. Rev. 401 (1945); Van Es et al., *Substitution of Some 4,5-Diphenyl-Oxazoles and -Imidazoles, and Some Related Compounds*, 1963 J. Chem. Soc. 1363 (1963); and Schrage, *Method of Preparing 2-Aryl Benzoxazoles and 2-Aryl Benzothiazoles*, U.S. Pat. No. 4,107,169 (Aug. 15, 1978), which are incorporated herein by reference.

The azole-containing compound is contacted with a displacing compound containing an organic moiety, a nucleophilic moiety bonded to the organic moiety and a counter-moiety bonded to the nucleophilic moiety. The organic moiety can be any moiety which is not electron withdrawing and which inert with respect to all reagents under reaction conditions. The organic moiety preferably comprises an alkyl group or an aromatic group and more preferably comprises an aromatic group. It preferably comprises no more than about 12 carbon atoms, more preferably no more than about 6 carbon atoms. When the organic moiety is aromatic, it has the descriptions and preferred embodiments previously used to described aromatic groups. The previous discussion regarding substituents ortho to the leaving group also applies to substituents ortho to the nucleophilic moiety.

The nucleophilic moiety is an oxygen atom, a sulfur atom or a nitrogen atom having a substituent. It is preferably an oxygen atom or a sulfur atom. If it is a nitrogen atom, then it must also be bonded to a hydrogen atom or an organic substituent which is inert with respect to all reagents under reaction conditions. The nitrogen atom is preferably bonded to a phenyl ring, an alkyl group having no more than about 6 carbon atoms, or a hydrogen atom, and is more preferably bonded to a hydrogen atom. The counter-moiety of the displacing compound conforms to the definition and preferred embodiments previously defined.

Many displacing compounds are well-known and commercially available. The displacing compound can be, for instance, an alcohol having from one to six carbon atoms such as methanol, hexanol or cyclohexanol; a phenolic compound such as phenol or cresol; aniline; diethylamine; thiophenol and so forth. Displacing compounds having a trialkylsilyl counter-moiety can be synthesized by known methods, such as by refluxing the compound having a hydrogen counter-moiety with hexalkyldisilazane. Displacing compounds having an alkali metal salt ion counter-moiety can be synthesized by known methods, such as contacting the compound having a hydrogen counter-moiety with a base-containing alkali metal ions.

The process may be carried out without a solvent at temperatures above the melting point of the reagents. The process is preferably carried out in a polar organic solvent, such as N-methylpyrrolidone, dimethyl sulfoxide, dimethyl acetamide, diphenyl sulfone and benzophenone. If the counter-moiety will not dissociate from the nucleophilic moiety in the solvent, then an activating compound capable of removing the counter-moiety should be added. Appropriate solvents and activating compounds for aromatic nucleophilic substitution are known to persons of ordinary skill in the art. The appropriate solvent and activating compound depend upon the choice of reagent.

If the counter-moiety is an alkali metal cation, no activating compound is ordinarily necessary because the salt ordinarily dissociates in any of the preferred solvents named above without a catalyst. If the counter-moiety is a trialkylsilyl moiety, the activating compound is preferably a catalytic amount of alkali metal halide salt. A preferred alkali metal halide salt is cesium fluoride. If the counter-moiety is a hydrogen atom, the activating compound is preferably a stoichiometric amount of strong base such as an alkali metal hydroxide, phenate or carbonate. Examples of preferred strong bases include sodium hydroxide, potassium carbonate and cesium phenate. If a solvent is used in connection with a strong base, the solvent should be an aprotic solvent such as N-methylpyrrolidone, dimethyl sulfoxide and dimethyl acetamide. Trialkylsilyl counter-moieties may also be used with basic catalysts.

The reaction preferably takes place in an anhydrous environment under an inert atmosphere. Examples of suitable inert gases include nitrogen, helium and argon. The pressure of the reaction may be subatmospheric or superatmospheric, but is conveniently about atmospheric pressure. The pressure is preferably low enough that volatile by-products of the reaction, such as trimethylsilyl halide, will distill off under reaction temperatures. An anhydrous environment may be generated by known methods such as adding to the solvent a small amount of cosolvent, such as toluene, chlorobenzene or xylene, which can remove water by azeotropic distillation.

The process takes place at a temperature high enough that the reaction may occur and low enough that the reagents do not decompose or distill off, and the products do not decompose. Optimal temperatures vary according to the reagents used and may readily be determined by experiment. Ordinarily, processes having a strong base as an activating compound proceed at lower temperatures than those having an alkali metal halide. Ordinarily, processes carried out without a solvent proceed at higher temperatures than those with a solvent to keep the reagents and/or products in liquid form. However, the temperature is preferably at least about 140° C.; more preferably at least about 160° C.; and most preferably at least about 200° C. The maximum temperature is not critical but is preferably at most about 400° C., more preferably at most about 350° C. and most preferably at most about 325° C.

The time for the reaction to go to completion varies as a function of the reagents used and the conditions under which they are reacted. The reaction is preferably essentially completed within about 5 hours, more preferably within about 3 hours. The yield of product is preferably at least about 80 percent, highly preferably at least about 90 percent, more preferably at least about 95 percent and most preferably at least about 99 percent.

The reaction preferably conforms to the formula set out in Formula 4:

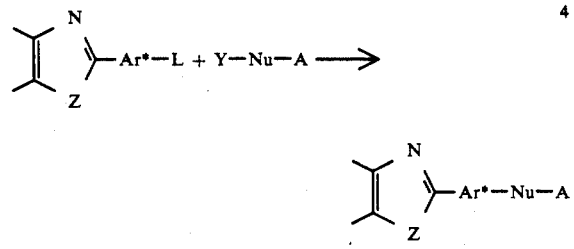

wherein:
A is an organic moiety of the displacing compound, as previously defined;
Ar* is an aromatic group of the azolecontaining compound, as previously defined;
Z is as previously defined in describing the azole rings;
L is a leaving group as previously described;
Nu is —O—, —S—, or —NR— as previously described in describing the nucleophilic moiety; and
Y is a counter-moiety for the nucleophilic moiety as previously described.

Of course, the organic moiety of the displacing compound (A) may be bonded to other reactive or inert groups which do not interfere with the reaction. Likewise, the azole ring may be bonded or fused with other reactive or inert groups which do not interfere with the reaction.

The nucleophilic displacement reactions of the present invention can be used conveniently in a process for synthesizing non-rigid-rod polymers. The non-rigid rod polymer is formed by the condensation polymerization of at least one difunctional monomer. Each difunctional monomer contains: (1) an organic moiety which is inert with respect to all polymerization reagents under polymerization conditions; and (2) at least two reactive groups selected such that a reaction between monomers, as previously described, may occur to form a polymer.

The organic moiety may be aromatic, aliphatic or aromatic-aliphatic. Aliphatic moieties within the organic moiety are preferably alkyl or halogenated alkyl. Aromatic groups within the organic moiety have the description and preferred embodiments previously defined. Each organic moiety is preferably independently aromatic-aliphatic or aromatic. Each organic moiety is most preferably an aromatic group.

Each monomer contains two reactive groups selected from azole-containing groups and displacing groups. Azole-containing groups comprise:

(1) an azole ring, as previously defined, bonded to the organic moiety;
(2) an aromatic group, as previously defined, bonded to the 2-carbon of the azole ring; and
(3) a leaving group, as previously defined, bonded to the aromatic group in a position where it is activated by the azole ring.

The previous discussions regarding the position of the leaving group with respect to the azole-containing group and regarding the position of substituents around the leaving group applies to monomers used for the present invention. The azole ring is highly preferably fused to an aromatic group in the organic moiety.

Displacing groups comprise:
(1) a nucleophilic moiety, as previously described, bonded to the organic moiety; and
(2) a counter-moiety, as previously described, bonded to the nucleophilic moiety.

The nucleophilic moiety should be bonded to the organic moiety at a point where the organic moiety does not exert a substantial electron-withdrawing influence upon it. The previous discussion regarding the placement of substituents which interfere with the reactions of the nucleophilic moiety applies to monomer used for the present invention.

Monomers used in the present invention may be AB-monomers, in which each monomer comprises an azole-containing group and a displacing group. AB-monomers can polymerize with each other, so that no second monomer is needed. Preferred AB-monomers useful for the present invention are discussed hereinafter.

Alternatively, approximate equimolar amounts of AA-monomer and BB-monomer can be polymerized. AA-monomers each comprise two azole-containing groups, and BB-monomers each comprise two displacing groups. Preferred AA-monomers and BB-monomers are described hereinafter. Preferably, the polymerization is carried out in the presence of a slight molar excess of either AA- or BB-monomer. The excess is preferred in order to hold down the molecular weight, because excessive molecular weight of the resulting polymer makes it less thermoplastic without substantially improving its physical properties. The excess is preferably no more than about 2 mole percent, more preferably no less than about 0.5 mole percent and most preferably about 1 mole percent.

Of course, obvious variations in the monomers polymerized may be practiced to achieve obvious variations in the resulting polymers. For instance, a mixture of monomers containing oxazole, thiazole and/or imidazole rings can be polymerized to form random PBO, PBT and PBI copolymers. AB-monomer can be polymerized in a mixture with approximately equimolar amounts of AA-monomer and BB-monomer to form a random copolymer containing both AB-polymer and AA/BB polymer mer units. Monomers containing different aromatic groups or nucleophilic moieties may likewise be polymerized to form random copolymers containing varied aromatic groups and linkages between mer units. Small amounts of monofunctional compounds, such as the displacing compounds and azole-containing compounds previously described, can be added as chain-terminating agents. A small amount of trifunctional monomer such as 1,3,5-trihydroxybenzene can be added to cause cross-linking.

The conditions for polymerization are substantially the same as those previously described for the reaction of displacing compounds and azole-containing compounds. If no solvent is used, the temperature is preferably at least the melting point of the monomer or monomers and the polymer. If solvent is used, the temperature may be lower. The temperature should be low enough that the reagents and the resulting polymer are stable. The reaction preferably takes place in an anhydrous environment under an inert atmosphere.

Polymers produced by the process are described in further detail after the description of preferred monomers.

AB-Monomers

AB-monomers useful in the practice of the present invention preferably comprise:
(1) a first aromatic group;
(2) an azole ring fused to said first aromatic group;
(3) a second aromatic group bonded to the 2-carbon of said azole ring;
(4) a leaving group bonded to said second aromatic group in a position where it is activated by said azole ring;
(5) a nucleophilic moiety, as previously defined, linked to said first aromatic group in a position not ortho to the 4- or 5-carbon of said azole ring; and
(6) a counter-moiety, as previously defined, bonded to said nucleophilic moiety.

The first aromatic group, the azole ring and the leaving group have the description and preferred embodiments previously defined for their respective groups. The second aromatic group has the definition and preferred embodiments previously given for an aromatic group in an azole-containing compound or group. In particular, the discussions regarding the positioning of the azole ring, the leaving group, and any substituents apply.

The nucleophilic moiety and the counter-moiety have the same descriptions and preferred embodiments previously given. The nucleophilic moiety is linked to the first aromatic group by a bond or by a divalent organic moiety. The divalent organic moiety should be non-electron-withdrawing. It preferably comprises no more than about 12 carbon atoms, more preferably no more than about 6 carbon atoms and more highly preferably no more than about 1 carbon atom. Most preferably, the monomer contains no divalent organic moiety, and the nucleophilic moiety is bonded directly to the first aromatic group. If the first aromatic group comprises an unfused ring system, then the nucleophilic moiety is preferably bonded to the aromatic moiety which is not fused with the azole ring. The nucleophilic moiety is highly preferably an oxygen atom or a sulfur atom.

AB-monomers preferably conform with Formula 5(a):

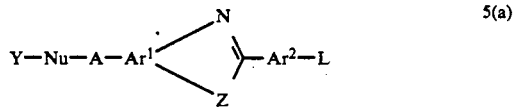

wherein $Ar^1$ is a first aromatic group as previously described, $Ar^2$ is a second aromatic group as previously described, A is a bond or a divalent organic moiety as previously described, and all other characters have the meanings previously assigned. AB-monomers more preferably conform with Formula 5(b) or 5(c):

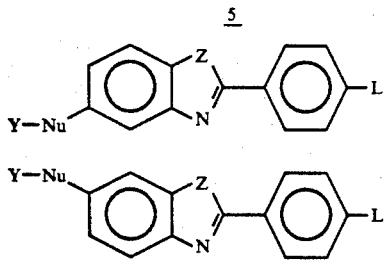

wherein Y is a hydrogen atom, a trialkylsilyl group or an alkali metal cation; L is chlorine or fluorine; Nu is a sulfur atom or an oxygen atom; and Z is as previously described. A less preferred embodiment conforms to Formula 5(d):

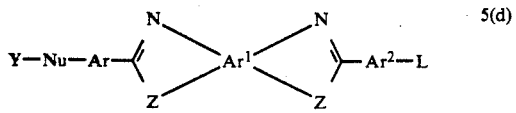

wherein all characters have the meaning previously described.

The most preferred AB-monomers are 5-hydroxy-2-(p-fluorophenyl)benzoxazole, 6-hydroxy-2-(p-fluorophenyl)benzoxazole and the alkali metal salt and trimethylsilyl derivatives thereof.

AB-monomers of the present invention can be synthesized by simple variation of reagents in known reactions such as those previously described for the synthesis of azole-containing compounds. For instance, AB-monomers are formed by the reaction of a first compound having:

(1) an aromatic group corresponding to the first aromatic group of the monomer ($Ar^1$);
(2) an o-amino-basic moiety, as that moiety is previously described, bonded to said aromatic group, and
(3) a nucleophilic moiety linked to said aromatic group ($Ar^1$) and bonded to a hydrogen atom with a second compound having:
(1) an aromatic group corresponding to the second aromatic group of the monomer ($Ar^2$);
(2) an "electron-deficient carbon group," as that term is previously defined, bonded to said aromatic group; and
(3) a leaving group, as that term is previously defined, bonded to said aromatic group.

The first compounds are known and can be synthesized by known processes, such as those described in Mital et al., "Synthesis of Some 5-Substituted 2-Aminobenzenethiols and their Conversion into Phenothiazines via Smiles Rearrangement," 1969 J. Chem. Soc. (C) 2148 (1969); and Henrich et al., "Ueber Derivate des 4-Amidoresorcins," 35 Chem. Berichte 4195 (1902) and the references cited therein, which are incorporated herein by reference. Preferred first compounds are 2-aminohydroquinone and 2-aminoresorcinol. The second compounds are also known and can be synthesized by known methods, such as by halogenating benzoic acid. Preferred second compounds are the p-halobenzoic acids and p-halobenzoyl halides.

Preferably, the first compound is dissolved in an aprotic solvent such as N-methylpyrrolidone under an inert atmosphere. A slight excess of the second compound is added to the mixture and the mixture is heated to reflux temperature for a time sufficient for all reagents to react, preferably about 2 hours. After permitting the mixture to cool, it is diluted with excess water and potassium carbonate is added. The product precipitates and may be filtered out of the solution. It may be purified by known methods such as recrystallization from ethanol and water. Procedures described in Bogert et al., "Researches on Thiazoles. XX," 57 J. Am. Chem. Soc. 1529 (1935); Henrich et al., "Ueber Derivate des 4-Amidoresorcins," 35 Chem. Berichte 4195 (1902) and Henrich et al., "Beiträge zur Kenntniss des Zusammenhangs zwischen Flourescenz und chemischer Constitution bei Derivativen des Benzoxazols," 37 Chem. Berichte 3108 (1904), which are incorporated herein can also be modified by substitution of reagents to provide compounds of the present invention.

The alkali metal salt and trialkylsilyl derivatives of those monomers can be produced by the methods already described. However, if the monomer is contacted with a base to generate the alkali metal salt, the temperature should be low enough to prevent substantial polymerization of the monomer.

AA/BB-Monomer Systems

AA/BB-monomer systems comprise an AA-monomer having two azole-containing reactive groups and a BB-monomer having two nucleophilic reactive groups. The AA-monomer preferably comprises:

(1) a first aromatic group ($Ar^1$);
(2) a first and a second azole ring fused to said first aromatic group;
(3) a second aromatic group ($Ar^2$) bonded to the 2-carbon of said first azole ring and a third aromatic group ($Ar^3$) bonded to the 2-carbon of said second aromatic group; and
(4) a first leaving group bonded to said second aromatic group and a second leaving group bonded to said third aromatic group, each in a position where it is activated by one of the azole rings.

The first aromatic group and the azole groups have the descriptions previously given. The second and third aromatic groups have the descriptions and preferred embodiments previously given for aromatic groups which are bonded to an azole group and to a leaving group. The leaving groups have the description and preferred embodiments previously given for leaving groups. They are highly preferably in ortho or para position, and most preferably in para position, with respect to the azole rings.

In AA-monomers, the first aromatic group ($Ar^1$) is preferably an unfused system comprising two aromatic moieties ($Ar^{1a}$ and $Ar^{1b}$) linked by a bond or a divalent linking moiety (D), as previously described in defining aromatic groups. The two aromatic moieties are more preferably linked by a divalent linking moiety. The first azole ring is fused to one aromatic moiety ($Ar^{1a}$) and the second azole ring is fused to the other aromatic moiety ($Ar^{1b}$). The second and third aromatic groups are bonded to the azole rings, and the leaving groups are bonded to the second and third aromatic groups, as previously described.

The AA-monomer preferably conforms to Formula 6(a):

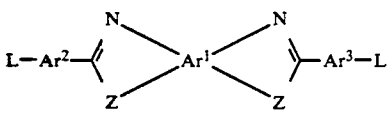

(6a)

wherein $Ar^1$, $Ar^2$ and $Ar^3$ are respectively the first, second and third aromatic groups as previously described and all other characters have the meanings previously given. The AA-monomer more preferably conforms to Formula 6b:

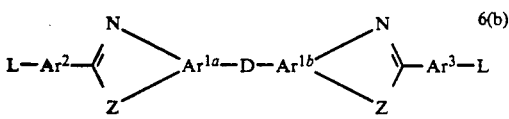

(6b)

wherein $Ar^{1a}$ and $Ar^{1b}$ are aromatic moieties within the first aromatic group ($Ar^1$) as previously defined, D is a divalent linking moiety, and all other characters have the meanings and preferred embodiments previously given.

AA-monomers can be synthesized by simple and simple variations on known processes. For instance, they may be synthesized by the reaction two equivalents of a compound having:
(1) an aromatic group corresponding to the second and third aromatic groups of the AA-monomer ($Ar^2$ and $Ar^3$);
(2) an "electron-deficient carbon group" bonded to said aromatic group; and
(3) a leaving groups as previously defined;
with a compound having:
(1) an aromatic group corresponding to the first aromatic group of the AA-monomer ($Ar^1$); and
(2) two o-amino-basic moieties bonded to said aromatic group.

Compounds having an aromatic group bonded to two o-amino-basic moieties, and the synthesis of those compounds, are described in Wolfe, *Liquid Crystalline Polymer Compositions, Process and Products*, U.S. Pat. No. 4,533,693 (Aug. 6, 1985) at Columns 19-24; in Lysenko, *High Purity Process for the Preparation of 4,6-Diamino-1,3-Benzenediol*, U.S. Pat. No. 4,776,244; and in Inbasekaren et al., Ser. No. 864,063, filed May 16, 1986, which are incorporated herein by reference. The reaction conditions are similar to those described for synthesizing the self-polymerizing monomer.

Alternatively, the AA-monomer can be synthesized in a three-step process. First, an di-amide is formed by reacting two equivalents a benzoic acid or acid chloride having a leaving group with an aromatic compound having two primary amine substituents. Second, two bromine atoms are introduced ortho to the amide groups by contacting the amide with 2.2 equivalents of molecular bromine. Third, the o-bromoamide moiety is cyclized to form the azole ring by reaction in a solvent such as dimethyl acetamide in the presence of a mild acid such as potassium carbonate under inert atmosphere catalyzed by copper powder.

Alternatively, monomers wherein $Ar^1$ is an unfused system having two aromatic moieties linked by a divalent linking moiety can be synthesized by reacting two moles of AB-monomer having hydrogen as the counter-moiety, as previously described, with one mole of a compound having two carboxylic acid groups under conditions such that the ester, amide or thioester is formed. The diacid compound becomes the divalent linking moiety (D) as that term is previously described. Simpler AA-monomers can be synthesized by the process described in 94 Chem. Abstracts 174948w, which is incorporated herein by reference.

BB-monomers preferably comprise:
(1) an organic moiety (A) which is not electron-withdrawing and which is inert with respect to all reagents under reaction conditions;
(2) two nucleophilic moieties, as that term is previously described, bonded to said divalent organic moiety; and
(3) two counter-moieties, as that term is previously described, bonded to the nucleophilic ions.

The organic moiety (A) has the same description and preferred embodiments previously given to describe the organic moiety in a monomer. It preferably comprises an aromatic group ($Ar^4$) having the description and preferred embodiments previously given for aromatic groups. All other moieties have the descriptions and preferred embodiments previously given. If the organic moiety (A) comprises an aromatic group ($Ar^4$), the nucleophilic moieties are preferably linked to the aromatic group in meta or para position with respect to each other, and more preferably in para position.

Alternatively, a bis-(alkali metal) sulfide may serve as a BB-monomer.

Suitable BB-monomers are commercially available and others can readily be synthesized by known methods. Examples of preferred BB-monomers include hydroquinone, resorcinol, hydroxybenzyl alcohol, sulfonyl bisphenol, bisphenol A, aminophenol, phenylenediamine, sulfonyl dianiline, benzidine, 2-mercaptoethanol, 4-mercaptophenol, 4-hydroxy-2-thiopyrimidine, 4,4'-oxy-bis(phenol), 4,4'-thio-bis(phenol) and alkali metal salt and trimethylsilyl derivatives thereof. Disodium sulfide is also an example of a BB-monomer. The monomers having hydrogen as a counter-moiety can be converted to monomers having other counter-moieties by known methods previously described.

BB-monomers preferably conform to Formula 7:

(7a)

and more preferably conform to Formula 7(b):

(7b)

wherein A is a divalent organic moiety as previously described; $Ar^4$ is an aromatic group and all other characters have the meanings previously assigned.

Polymers Synthesized by Processes and Monomers of the Invention

The polymers synthesized according to the process of the present invention contain a plurality of mer units which fall into one of two species. AB-polymers contain mer units comprising:
(1) a first aromatic group;
(2) an azole ring fused to said first aromatic group;
(3) a second aromatic group bonded to the 2-carbon of said azole ring; and
(4) an oxygen, sulfur or nitrogen atom linked to said first aromatic group and bonded by a single bond to the second aromatic group of an adjacent mer unit.

The first and second aromatic groups and the oxygen, sulfur or nitrogen atom in the polymer correspond to, and have the definition and preferred embodiments of, the first and second aromatic groups and the nucleophilic moiety of the AB-monomer. The oxygen, sulfur or nitrogen atom may be linked to the first aromatic group by a divalent organic moiety (A) having the description previously given in describing AB-monomers, or it may be bonded directly to the first aromatic group. It is preferably bonded directly to the first aromatic group.

The polymer synthesized by the reaction of an AB-monomer preferably contains a plurality of units which conform with Formula 8:

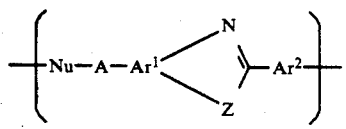

wherein all characters have the meanings previously assigned in describing AB-monomers. The polymer more preferably contains a plurality of units which conform with either Formula 9(a) or 9(b):

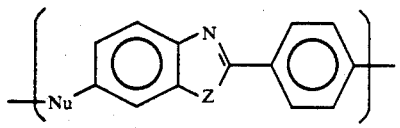

(a)

9

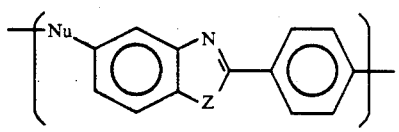

(b)

wherein Z and Nu are each indepedently either an oxygen atom or a sulfur atom. The polymer most preferably contains a plurality of units which conform with either Formula 9(a) or 9(b) wherein Z and Nu are each an oxygen atom.

AA/BB-polymers preferably contain a plurality of repeating units which comprise:
(1) a first aromatic group ($Ar^1$);
(2) a first and a second azole ring fused to said first aromatic group;
(3) a second aromatic group ($Ar^2$) bonded to the 2-carbon of said first azole ring and a third aromatic group ($Ar^3$) bonded to the 2-carbon of said second aromatic group;
(4) a first oxygen, sulfur or nitrogen atom bonded to said second aromatic group and a second oxygen, sulfur or nitrogen atom bonded to said first aromatic group; and (5) an organic moiety (A) bonded to said second oxygen, sulfur or nitrogen atom and to the first oxygen, sulfur or nitrogen atom of an adjacent unit.

The first, second and third aromatic groups and the first and second azole rings have the preferred embodiments previously set out for the corresponding structures in describing the AA-monomer used in the polymerization. The first and second oxygen, sulfur or nitrogen atoms have the description and preferred embodiments previously used to describe nucleophilic moieties in BB-monomers. The organic moiety has the description and preferred embodiments of organic moieties in BB-monomers. The first and second oxygen, sulfur or nitrogen atoms are preferably bonded to the second and third aromatic groups in the positions previously described for leaving groups to be bonded to those aromatic groups in the AA-monomers.

Mer units in AA/BB-polymers preferably conform with Formula 10(a):

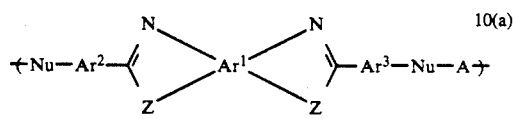

and more preferably conform with Formula 10(b):

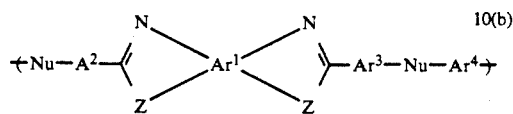

wherein all characters have the meanings and preferred embodiments previously assigned. Mer units in AA/BB-polymers more highly preferably conform to either Formula 11(a) or 11(b):

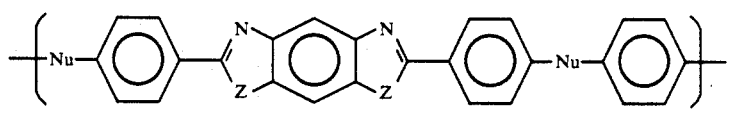

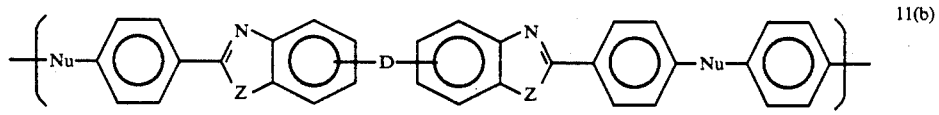

wherein each Z and each Nu is independently an oxygen atom or a sulfur atom and D is a bond or a divalent linking group as previously defined. Mer units most preferably comply with Formula 11(b). Each Z is most preferably an oxygen atom.

The number average molecular weight of polymer synthesized by the present invention is preferably at least about 5000 and more preferably at least about 10,000. Such molecular weights are ordinarily measured indirectly by measuring intrinsic viscosity in a solvent such as methanesulfonic acid or concentrated sulfuric acid. The relationship between intrinsic viscosity and molecular weight is different for each individual polymer and may vary widely from one polymer to the next.

Polymers synthesized according to the present invention are ordinarily thermoplastic. One exception is the AA/BB-polymer in which $Ar^1$ is a 1,2,4,5-phenylene group or structurally equivalent heterocyclic moiety and Ar$^2$, Ar$^3$ and Ar$^4$ are p-phenylene groups or structurally equivalent biphenylene or heterocyclic moieties. Those polymers ordinarily have no glass transition temperature below their decomposition temperature. Glass transition temperatures of thermoplastic polymers vary according to the polymer structure, composition and molecular weight. Likewise, preferred glass transition temperatures will vary according to the polymer and its intended use.

It has surprisingly been discovered that PBZ polymers synthesized according to the process of the present invention experience slower loss of weight due to thermal oxidation at high temperatures than do similar PBZ polymers synthesized in polyphosphoric acid according to the prior art processes. It is theorized, without intending to be bound thereby, that the prior art polymers retain some phosphoric or polyphosphoric acid after synthesis and that the acid hastens thermal degradation of the polymer in air. Polymers of the present invention are not polymerized in acid and do not contain any strong acid unless extruded from acid after polymerization.

Polymers synthesized according to the process of the present invention can be shaped by known processes to form useful articles. For instance, the polymers may be molded at temperatures above their glass transition temperature. Alternatively, the polymers can be dissolved in mineral acid to form polymer dopes, which can be extruded to form useful fibers, films and shaped articles according to processes readily familiar to persons skilled in the art. See, e.g., U.S. Pat. No. 4,533,693 at Columns 82-84; Chenevey et al., *Process for Preparing Shaped Articles of Rigid Rod Heterocyclic Liquid Crystalline Polymers*, U.S. Pat. No. 4,606,875 (Aug. 19, 1986); Chenevey et al., *Process for Preparing Film of Poly{[Benzo(1,2-D: 4,5-D')bisthiazole-2,6-diyl]-1,4-phenylene}, its Cis Isomer or Mixtures Thereof*, U.S. Pat. No. 4,487,735 (Dec. 11, 1984); Tan, *Process for Producing High-Strength, pg,60 Ultralow Denier Polybenzimidazole (PBI) Filaments*, U.S. Pat. No. 4,263,245 (Apr. 21, 1981); Hwang et al., "Solution Processing and Properties of Molecular Composite Fibers and Films," 23 Poly. Eng. & Sci. 784, 785 (1984); and Hwang et al., "Composites on a Molecular Level: Phase Relationships, Processing, and Properties," B22(2) J. Macromol. Sci.-Phys. 231, 234-35 (1983), which are incorporated by reference.

Polymers synthesized according to the process of the present invention can be incorporated into molecular composites with rigid rod PBZ polymers. A well-mixed dope is formed comprising mineral acid, polymers synthesized according to the present invention, and rigid rod PBZ polymer. The dope is extruded as described above. The molecular composites ordinarily are not substantially phase separated upon extrusion, and therefore have high tensile strength and modulus. The composites do experience some phase separation upon heating to their glass transition temperature.

ILLUSTRATIVE EXAMPLES

The following examples are for illustrative purposes only and should not be interpreted as limiting the scope of either the specification or the claims. Unless it is otherwise specified, all parts and percentages are by weight.

I. Present Invention Practiced Without Polymerization

EXAMPLE 1

Synthesis of 4,5-Diphenyl-2-(p-phenoxyphenyl)-1,3-oxazole

A mixture containing one gram (3.2 mmoles) of 4,5-diphenyl-2-(p-fluorophenyl)-1,3-oxazole, 1.2 g (12 mmoles) of phenol, 2 g (14.5 mmoles) of anhydrous potassium carbonate and 10 ml of N-methylpyrrolidone (hereinafter NMP) is stirred and refluxed under nitrogen atmosphere for 40 minutes when gas chromatograph analysis indicates the disappearance of the starting material and the formation of a new compound. The reaction mixture is cooled, diluted with 30 ml of water, and stirred for 30 minutes. The colorless precipitate is filtered and recrystallized from 95 percent ethanol. The title compound (1.22 g, 99 percent yield) is recovered. The product has a melting point of 125° C.-126° C.

EXAMPLE 2

Synthesis of 2-(o,p-Di-phenoxyphenyl)benzoxazole

The procedure of Example 1 is repeated using 1.5 g (5.7 mmoles) of 2-(o,p-dichlorophenyl)benzoxazole, 4 g (42 mmoles) of phenol, 3 g (21.7 mmoles) of potassium carbonate and 13 ml of NMP with reflux for 2.5 hours. The title product (1.95 g, 92.1 percent yield) is recovered.

EXAMPLE 3

Synthesis of 2-[(2',4'-bis(p-methoxyphenyl)thiophenoxy)]benzoxazole

A mixture of 2.64 g (10 mmoles) of 2-(2',4'-dichlorophenyl)benzoxazole, 4.0 g (30 mmoles) of potassium carbonate, ·3.36 g (24 mmoles) of 4-methoxybenzenethiol and 20 ml of NMP is stirred and refluxed under nitrogen atmosphere for one hour. The mixture is cooled, diluted with 50 ml of water and extracted with two 40-ml portions of methylene chloride. The methylene chloride extracts are dried with magnesium sulfate and evaporated to provide a colorless solid. The title product is recrystallized from the colorless solid using aqueous ethanol. The yield is 3.9 g (82.5 percent) of colorless needles having a melting point of 151° C.-155° C.

EXAMPLE 4

Synthesis of 2-(p-phenoxyphenyl)benzoxazole

A mixture of 1.20 g (5 mmoles) of 2-(p-nitrophenyl)benzoxazole, 0.80 g (8.5 mmoles) of phenol, 2 g of potassium carbonate and 15 ml of NMP is stirred and refluxed under nitrogen atmosphere for one hour. The title product is recovered from the resulting solution as described in Example 1. The recovery is 1.15 g (80.4 percent yield). The product has a melting point of 70° C.-71° C. The experiment is repeated using 2-4(p-fluorophenyl)benzoxazole as the reagent and the title product is obtained in 90 percent yield.

EXAMPLE 5

Synthesis of 2-(p-methoxyphenyl)benzoxazole

A mixture of 1.15 g (5 mmoles) of 2-(p-chlorophenyl)benzoxazole, 2.5 g of sodium methoxide and 10 ml of dimethyl sulfoxide is heated at 80° C.-90° C. under nitrogen atmosphere for one hour. The mixture is cooled and diluted with 100 ml of water. The title compound (1 g, 87 percent yield) precipitates and is recovered. It has a melting point of 99.5° C.–101.5° C.

EXAMPLE 6

Synthesis of
5-chloro-2-(4-piperidinophenyl)benzoxazole

A mixture containing 2.48 g (10 mmoles) of 5-chloro-2-(4-fluorophenyl)benzoxazole, 2.55 g (30 mmoles) of piperidine and 15 ml of NMP is heated with stirring under nitrogen atmosphere at 100° C. for 16 hours. The reaction is complete as judged by GC analysis. The mixture is cooled, poured into 100 ml of water and stirred for 30 minutes. The title compound (3.05 g, 97 percent yield) is filtered and washed. It has a melting point of 162° C.–164° C.

II. Synthesis and Polymerization of AB-Monomers

EXAMPLE 7

Synthesis of 2-(4-Fluorophenyl)-6-hydroxybenzoxazole

4-Aminoresorcinol HCl salt (1.61 g) is dissolved in 10 ml of NMP under nitrogen atmosphere. 4-Fluorobenzoyl chloride (1.91 g) is added all at once and the mixture is heated under reflux for approximately 2 hours. After reflux, the mixture is allowed to cool and is diluted with 60 ml of water. Potassium carbonate (3.5 g) is added and the mixture is stirred. The resulting precipitate is filtered and recrystallized from ethanol and water to yield 1.85 g of the above-named product. The product melts at 225° C.–227° C.

EXAMPLE 8

Synthesis of 2-(4-Fluorophenyl)-5-hydroxybenzoxazole

The procedure of Example 7 is repeated using 1.61 g of 2-aminohydroquinone HCl salt in place of the 4-aminoresorcinol salt. The above-named product is obtained and has a melting point of about 166° C.–168° C.

EXAMPLE 9

Synthesis of
2-(4-Fluorophenyl)-6-hydroxybenzothiazole

The procedure set out in Example 7 is repeated using 2-amino-5-methoxybenzenethiol and 4-fluorobenzoyl chloride. The reaction yields a mixture of the title compound and 2-(4-fluorophenyl)-6-methoxybenzothiazole. The mixture is treated with excess boiling 48 percent HBr for one hour to convert the latter product to the title compound. The solution is filtered and the precipitate is recrystallized from ethanol and water. The overall yield is 80.3 percent based on the initial amount of benzenethiol. A recrystallized product melts at about 221° C.–223° C.

EXAMPLE 10

Synthesis of
2-(4-Fluorophenyl)-5,7-diaza-6-hydroxy-benzoxazole

The procedure set out in Example 7 is repeated using 5-amino-2,4-dihydroxypyrimidine and 4-fluorobenzoyl chloride. The title compound is obtained as an off-white amorphous solid with a melting point of about 355° C.–357° C.

EXAMPLE 11

Synthesis of Trimethylsilyl Monomers (a) 2-(4-Fluorophenyl)-6-hydroxybenzoxazole (20.43 g, 89.13 mmoles) from Example 7 is mixed with 90 ml of hexamethyldisilazane. The mixture is refluxed for 260 minutes and then the excess silating agent is distilled off at 80° C. and 20 mm Hg. The product is purified by bulb-to-bulb distillation. 2-(4-Fluorophenyl)-6-(trimethylsilylether)benzoxazole (25.49 g, 95 percent yield) is recovered, having a melting point of 95.5° C.–96.5° C.

(b) The procedure of Example 11(a) is repeated using 10.57 g of the monomer from Example 8 and 50 ml of hexamethyldisilazane, and reacting for 7 hours. The product 2-(4-fluorophenyl)-5-(trimethylsilylether)-benzoxazole has a melting point of 222° C.–224° C.

(c) The procedure of Example 11(a) is repeated using 10.59 g of the product of Example 9 and 50 ml of hexamethyldisilazane and refluxing for about 15 hours. The product 2-(4-fluorophenyl)-5-(trimethylsilylether)-benzothiazole has a melting point of 79.5° C.–80° C.

EXAMPLE 12

Polymer from Monomer of Example 11(a)

A resin kettle equipped with a short path still and a nitrogen inlet is charged with 10 g of diphenylsulfone, 10 g of the compound prepared in Example 11(a) and 25 ml of chlorobenzene. The mixture is stirred as the chlorobenzene is distilled off slowly to azeotropically remove water. Cesium fluoride (21.8 mg) is added and the mixture is heated from 280° C. to 350° C. over a 30-minute period. After an additional 70 minutes, the flask is removed from the heat and allowed to cool. The resulting polymer is recovered and placed in a Soxhlet extractor with refluxing methylene chloride overnight. It is then placed in a vacuum oven at 150° C. overnight. The resulting polymer has an inherent viscosity of 1.99 dL/g in concentrated sulfuric acid (0.5 g/dL at 25° C.) and an inherent viscosity of 7.18 dL/g in methanesulfonic acid (0.2 g/dL at 25° C.). DSC scan reveals a broad Tm at 370° C. A rescan reveals a Tg at 198° C. Analysis by TGA at 50 ml/min. airflow rate and 10° C./min. heating shows that the polymer has a 1 percent weight loss at 514° C. and a 5 percent weight loss at 556° C.

EXAMPLE 13

Preparation of Polymer from
2-(4-Fluorophenyl)-5-trimethylsiloxy Benzoxazole

A resin kettle is charged with 10 g of diphenylsulfone and 10 g of the monomer from Example 11(b). The mixture is warmed under vacuum at 100° C. for 30 minutes to remove water. Cesium fluoride (10 mg) is added and the kettle is evacuated and refilled with argon three times. The kettle is immersed in a molten salt bath at 250° C. After 5 minutes, trimethylsilyl fluoride begins to distill. The temperature is gradually raised to 330° C. over 30 minutes. After 70 minutes total, the polymerization is stopped and the polymer is purified as described in Example 12. The product has an inherent viscosity of 0.74 dL/g in concentrated sulfuric acid and 3.91 dL/g in methanesulfonic acid. An initial DSC scan reveals a weak Tg at 257° C. and a strong sharp Tm at 396°·C. On rescan, a weak Tg at 227° C. is observed.

EXAMPLE 14

Preparation of Polymer of
2-(4-Fluorophenyl)-5-trimethylsiloxy Benzothiazole

A resin kettle equipped with a short path still and a nitrogen inlet is charged with 12 g of diphenylsulfone and 25 ml of chlorobenzene. The chlorobenzene is distilled off slowly with stirring to azeotropically remove water. The monomer from Example 11(c) (11.4 g) is washed with 5 ml of chlorobenzene and 48.9 mg of cesium fluoride is introduced. The solution is heated from 280° C. to 300° C. Trimethylsilylfluoride is immediately generated. After 11 minutes, the temperature is raised to 330° C. and reaction is continued for 84 minutes. The polymer is isolated as described in Example 12. It has an inherent viscosity of 0.55 dL/g in concentrated sulfuric acid. An initial DSC scan reveals a strong sharp Tm at 426° C. A Tg of 247° C. is observed on rescan.

III. Synthesis of AA-Monomers and Polymerization with BB-Monomers

EXAMPLE 15

Synthesis of 2,6-Di(p-fluorophenyl)benzobisoxazole (cis monomer)

N,N'-Bis(p-fluorobenzoyl)-1,3-diaminobenzene is contacted with 2.2 equivalents of bromine in acetic acid at 70° C. for one hour to yield 1,3-dibromo-4,6-bis-(p-fluorobenzamido)benzene. That product (30.6 g, 0.06 mole) is stirred with 200 ml of dimethyl acetamide under nitrogen atmosphere. Copper powder (3 g) and 16.5 g of potassium carbonate is added and the mixture is refluxed for one hour. After cooling to ambient temperature, the precipitated product is filtered and washed with dilute nitric acid, with water and with ethanol. The title compound (16.9 g, 80.9 percent yield) shown in Formula 12 is recovered. Its melting temperature, as shown by DSC is 361.4° C.

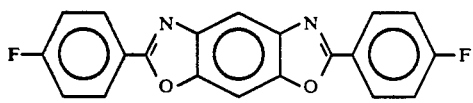

12

EXAMPLE 16

Synthesis of 2,6-Di(p-fluorophenyl)benzo[1,2-d;4,5-d']-bisoxazole (trans monomer)

The dihydrogen chloride salt of 2,5-diamino-1,4-hydroquinone (3.2 g, 0.015 mole) is added with stirring to 30 ml of NMP under nitrogen atmosphere. p-Fluorobenzoyl chloride (5.8 g, 0.036 mole) is added over 30 minutes at 170° C. The mixture is refluxed for 3 hours and then cooled. The resulting precipitate is filtered and washed with water, ethanol and ether. The product, shown in Formula 13, is then recrystallized from dimethyl sulfoxide to provide 4.70 g (92.1 percent yield) of the title compound having a melting point in excess of 340° C.

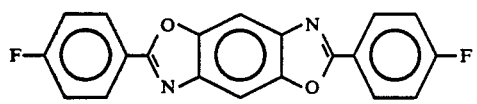

13

EXAMPLE 17

Synthesis of Bis-(6-(p-fluorophenyl))benzoxazole)

The dihydrogen iodide salt of 3,3'-dihydroxy-4,4'-diaminobiphenyl (2.93 g, 0.062 mole) is mixed with 100 ml of NMP under nitrogen atmosphere. p-Fluorobenzoyl chloride (19.66 g, 0.124 mole) is added dropwise and the mixture is slowly heated to reflux over a period of about one hour. After 2 hours reflux the mixture is cooled. Water (600 ml) is added and stirred for 30 minutes. The resulting precipitate is filtered, washed with water and ethanol and dried. The title compound, shown in Formula 14 (21 g, 80.8 percent yield) is obtained having a melting point of 273° C.-275° C.

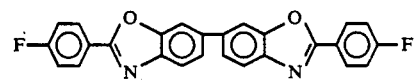

14

EXAMPLE 18

Synthesis of 1,3-Bis-[2-(p-fluorophenyl)-6-benzoxazolyl]benzene

Benzoxazolone (59.4 g, 0.44 mole), isophthalic acid (33.2 g, 0.20 mole) and 550 g of polyphosphoric acid are heated under nitrogen atmosphere to 140° C. over 30 minutes with stirring. The mixture is heated to 170° C. over 45 minutes and is stirred at 170° C. for one hour. The mixture is cooled to 130° C. and poured carefully into 3 liters of ice water. The mixture is stirred for 15 minutes and the precipitate is filtered. The precipitate is washed with water, 10 percent sodium hydrocarbonate solution, more water and then ethanol. Crude bis-keto-bisbenzoxazolone (80 g, 100 percent yield) is recovered. A small amount is recrystallized from DMF and melts at 357° C.-359° C.

The crude bis-keto-bisbenzoxazolone product from the previous paragraph is stirred and refluxed with 1.5 liters of 5N sodium hydroxide solution under nitrogen atmosphere for 16 hours. The resulting mixture is cooled, diluted with 500 ml of water and neutralized with 580 ml of concentrated hydrochloric acid. After settling for a few hours, the resulting precipitate is filtered, washed with water and recrystallized from a 9:1 mixture of water and ethanol by volume. 1,3-Bis-(4-amino-3-hydroxybenzoyl)benzene (51 g, 73.3 percent yield) is recovered.

The recrystallized product from the preceding paragraph is mixed with 200 ml of NMP under nitrogen atmosphere. p-Fluorobenzoyl chloride (38.0 g, 0.24 mole) is added dropwise. The mixture is heated at 120° C.-140° C. for one hour and at reflux for 2 hours. The mixture is cooled to 70° C. and 500 ml of ethanol is added with stirring. After 15 minutes the resulting precipitate is filtered and recrystallized from NMP. The title compound (50.6 g, 90 percent yield) illustrated in Formula 15 is recovered and has a melting point of 287.5° C.-289° C.

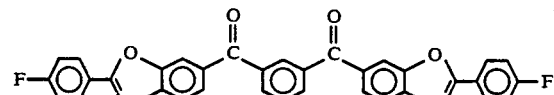

15

EXAMPLE 19

Synthesis of 1,3-Bis-(2-(p-fluorophenyl)benzoxazole-6-oxycarbonyl)propane

6-Hydroxy-2-(p-fluorophenyl)benzoxazole (20.00 g, 0.087 mole) from Example 7 is mixed with 300 ml of toluene and 12 g (0.12 mole) of triethylamine under nitrogen atmosphere. Glutaryl chloride (7.10 g, 0.042 mole) is added and the mixture is stirred and heated at reflux for 5 hours. After cooling to room temperature 300 ml of 1N hydrogen chloride is added and stirring is continued for a few minutes. The resulting precipitate is filtered and recrystallized from DMF. The title compound (20.5 g, 88 percent yield), illustrated in Formula 16, is recovered and has a melting point of 189° C.-190° C.

ing for 24 hours at 250° C., it has a glass transition temperature of 196° C. and a melting point of 290° C.

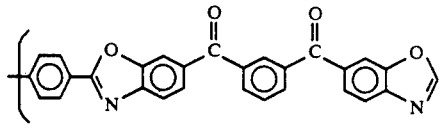

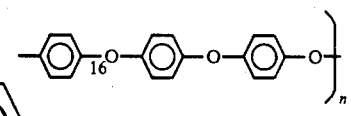

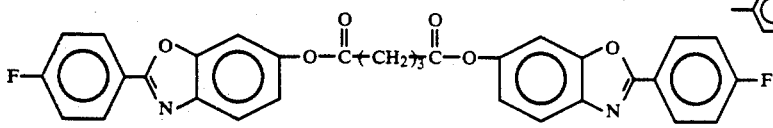

EXAMPLE 20

Synthesis of Poly(cis-benzobisoxazole(diphenoxybenzene)) Polymer

The monomer from Example 15 (5.008 g, 14.378 mmoles) is mixed with 11 g of diphenylsulfone, 25 ml of chlorobenzene, and 3.659 g (14.378 mmoles) of bis-(trimethylsiloxy)benzene under nitrogen atmosphere. The mixture is heated to distill the chlorobenzene to dehydrate the monomers and solvent. Cesium fluoride catalyst (19.4 mg) is added and the mixture is heated to 280° C. After 80 minutes the mixture is heated to 330° C. for 5½ hours. The resulting precipitate is placed in a Soxhlet extractor overnight with methylene chloride and then dried overnight at 150° C. in a vacuum oven. The title polymer, illustrated in Formula 17, is recovered. It has an inherent viscosity of 0.35 dL/g in concentrated sulfuric acid and an inherent viscosity of 0.84 dL/g in methanesulfonic acid at 25° C. The polymer has no observable glass transition temperature below 450° C.

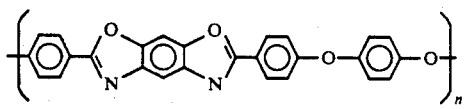

The polymer is analyzed by TGA at 316° C. under air flowing at 50 ml/minute. After 20 hours, the polymer retains 95 percent of its initial weight and after 90 hours, the polymer retains about 85 percent of its initial weight.

EXAMPLE 21

Synthesis of Thermoplastic PBO Polymer

The monomer prepared in Example 18 (8.000 g, 14.37 mmoles) is mixed under nitrogen with 15.00 g of diphenylsulfone and 25 ml of chlorobenzene. The chlorobenzene is distilled off at atmospheric pressure to dehydrate the starting materials. Bis-(p-trimethylsiloxyphenyl)ether (4.932 g, 14.23 mmoles) and 57.9 mg of cesium fluoride catalyst are added and washed in with 4 ml of chlorobenzene. The mixture is heated with stirring to 275° C. After 15 minutes, the temperature is raised to 286° C. The resulting polymer crystallizes making stirring difficult. The polymer is placed in a Soxhlet extractor with methylene chloride overnight and dried in a vacuum oven at 140° C. overnight. The resulting polymer, illustrated in Formula 18, has an inherent viscosity in concentrated sulfuric acid of 1.01 dL/g. After anneal- Samples of the polymer are compression molded into films having 0.02-inch thickness. Tensile data is acquired from molded microtensile bars of polymer according to ASTM D-1708. The polymer has a tensile modulus of 532 kpsi, a yield stress of 14.6 kpsi, a yield strain of 13.0 kpsi and an ultimate elongation of 15 percent.

EXAMPLE 22

Synthesis of Thermoplastic PBO Polymer

The procedure of Example 21 is repeated using 5.517 g (9.913 mmoles) of the monomer from Example 18, 12.88 g of diphenylsulfone, 25 ml of chlorobenzene, 3.436 g (9.913 mmoles) of the bis-trimethylsiloxy monomer, 90.8 mg of cesium fluoride, and an additional 4 ml of chlorobenzene. From 275° C., the temperature of the reaction is raised to 320° C. over a 20-minute period until the resin becomes too viscous to stir. The product is refluxed overnight with methylene chloride, chopped into small pieces and placed in a Soxhlet extractor with additional methylene chloride. It is then dried in a vacuum oven at 140° C. overnight. The resulting polymer, as illustrated in Example 21, has an inherent viscosity of 3.58 dL/g in concentrated sulfuric acid. Upon an initial DSC scan a glass transition temperature of 214° C. and a melting temperature of 276° C. are observed. Upon rescan only a glass transition temperature of 200° C. is observed.

EXAMPLE 23

Synthesis of Thermoplastic PBO Polymer

The procedure of Example 21 is followed except that 5.640 g (10.14 mmoles) of the monomer from Example 18 is used with 9.074 g of diphenylsulfone, 25 ml of chlorobenzene, 2.579 g (10.14 mmoles) of bis-trimethylsiloxy benzene and 110.1 mg of cesium fluoride. After 15 minutes at 250° C., the temperature is raised to 280° C. After an hour, the reaction product is an unstirrable solid. Cesium fluoride (70.7 mg) is added and the temperature is raised to 300° C. at which point the product is a brown viscous oil. After one hour, the reaction mixture is cooled. The product is stirred overnight with methylene chloride and filtered. The product is then boiled with 100 ml of 2-propanol, filtered, dried and placed in a vacuum oven at 140° C. overnight. The resulting polymer, illustrated in Formula 19, has an inherent viscosity of 0.41 dL/g. A first DSC scan reveals two sharp endotherms at 289° C. and 318° C., while a second scan indicates only a glass transition temperature at 177° C.

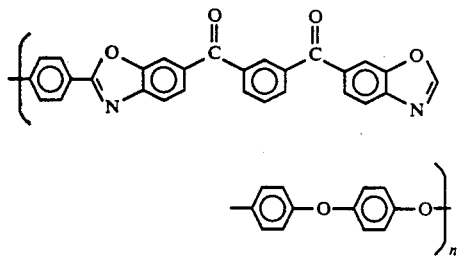

EXAMPLE 24

Polymer Containing Bisphenol A

The difluoride monomer from Example 18 (13.908 g, 25.0 mmoles) is mixed with 5.650 g (24.75 mmoles) of bisphenol A, 7.60 g (55.00 mmoles) of potassium carbonate, 200 ml of dimethyl acetamide and 120 ml of toluene. The mixture is refluxed for 4 hours and toluene is trapped in a Dean-Stark trap. Toluene is drained from the trap and the reflux is continued overnight. A mixture of 1:1 acetic acid and dimethyl acetamide by volume (4 ml) is added and the polymer is isolated by precipitation into 500 ml of water in a blender while hot. The polymer is filtered, reblended once with 500 ml of cold water and reblended once with 500 ml of isopropanol. The polymer is air dried overnight and placed in a vacuum oven at 140° C.–150° C. overnight. The product polymer, illustrated in Formula 20, has an inherent viscosity of 0.73 dL/g in concentrated sulfuric acid and a glass transition temperature of 203° C.

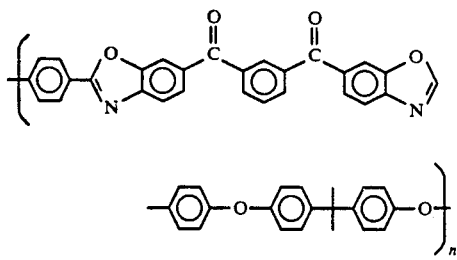

EXAMPLE 25

Synthesis of Polymer Containing Aliphatic Moieties

The procedure of Example 23 is followed using 13.863 g of the monomer prepared in Example 19, 5.650 g (24.75 mmoles) of bisphenol A, 7.60 g (55.00 mmoles) of potassium carbonate, 200 ml of dimethyl acetamide and 120 ml of toluene. The resulting polymer is insoluble in methylene chloride, 1,1,2,2-tetrachloroethane, and dimethyl acetamide. It dissolves with decomposition in concentrated sulfuric acid. An initial DSC scan shows a glass transition temperature of 157° C. and a melting temperature of 280° C., while a second scan shows only a glass transition temperature of 157° C. The polymer has a formula shown in Formula 21.

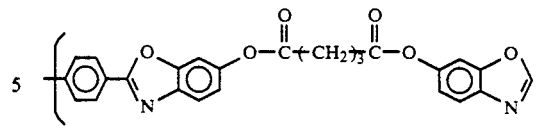

What is claimed is:

1. A process for synthesizing non-rigid-rod PBZ polymer comprising polymerizing, under conditions suitable for nucleophilic substitution reactions, one or more difunctional monomers, each said monomer independently containing:
   (1) an organic moiety which is inert with respect to all reagents under reaction conditions; and
   (2) two reactive groups selected, such that a polymer is formed, from the class consisting of:
      (a) azole-containing groups having: an azole ring bonded to said organic moiety, an aromatic group bonded to the 2-carbon of said azole ring, and a leaving group bonded to said aromatic ring in a position where it is activated by said azole ring, wherein the leaving group is a halogen atom, an alkoxy group, an aryloxy group or a nitro group; and
      (b) displacing groups having: a nucleophilic moiety, which nucleophilic moiety is a nitrogen atom having a hydrogen atom or inert organic substituent or an oxygen atom or a sulfur atom, bonded to said organic moiety; and a counter-moiety bonded to said nucleophilic moiety that can dissociate from the nucleophilic moiety under reaction conditions, whereby a non-rigid-rod PBZ polymer is formed.

2. A PBZ polymer synthesized by polymerizing, under conditions suitable for nucleophilic substitution reactions, one or more difunctional monomers, each said monomer independently containing:
   (1) an organic moiety which is inert with respect to all reagents under reaction conditions; and
   (2) two reactive groups selected, such that a polymer is formed, from the class consisting of:
      (a) azole-containing groups having: an azole ring bonded to said organic moiety, an aromatic group bonded to the 2-carbon of said azole ring, and a leaving group bonded to said aromatic ring in a position where it is activated by said azole ring, wherein the leaving group is a halogen atom, an alkoxy group, an aryloxy group or a nitro group; and
      (b) displacing groups having: a nucleophilic moiety, which is an oxygen atom, a sulfur atom or a nitrogen atom, bonded to said organic moiety; and a counter-moiety bonded to said nucleophilic moiety that can dissociate from the nucleophilic moiety under reaction conditions, whereby a non-rigid-rod PBZ polymer is formed.

3. A thermoplastic polymer comprising a plurality of repeating units which contain:
   (1) a first aromatic group;
   (2) an azole ring fused to said first aromatic group;

(3) a second aromatic group bonded to the 2-carbon of said azole ring; and (4) an oxygen, sulfur or nitrogen atom bonded by single bonds to said second aromatic group and to the first aromatic group of an adjacent unit.

4. A molecular composite comprising the polymer of claim 3 and a rigid rod PBZ polymer.

5. The process of claim 1 wherein the difunctional monomers are represented by the Formula:

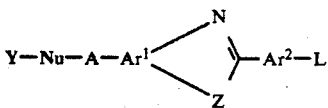

wherein:

Ar$^1$ and Ar$^2$ are aromatic groups;

Z is an oxygen atom, a sulfur atom or —NR— wherein R is a hydrogen atom or an alkyl group;

A is a bond or a divalent organic moiety that does not interfere with the polymerization reaction;

Nu is a nucleophilic moiety which is an oxygen atom, a sulfur atom or a nitrogen atom having a substituent that does not interfere with the polymerization;

Y is a countermoiety that can dissociate from the nucleophilic moiety;

L is a leaving group that can be displaced from the aromatic group by an anion of the nucleophilic moiety.

6. The process of claim 5 wherein Ar$^1$ and Ar$^2$ are each carbocyclic rings containing 6 carbon atoms.

7. The process of claim 5 wherein Z and Nu are each independently an oxygen atom or a sulfur atom.

8. The process of claim 5 wherein A is a bond.

9. The process of claim 5 wherein Y is a hydrogen atom, an alkali metal ion or a trialkylsilyl moiety.

10. The process of claim 5 wherein L is a halogen atom.

11. The process of claim 5 wherein the difunctional monomers are represented by either of the Formulae:

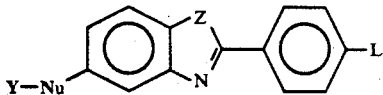

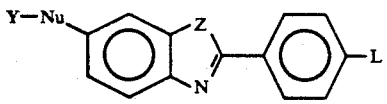

wherein Y is a hydrogen atom, a trialkylsilyl group or an alkali metal cation; L is chlorine or fluorine; Nu is a sulfur atom or an oxygen atom; and Z is a sulfur atom or an oxygen atom.

12. The process of claim 5 wherein the polymerization takes place in an anhydrous organic solvent.

13. The process of claim 12 wherein the polymerization takes place in the presence of a stoichiometric amount of strong base.

14. The process of claim 12 wherein Y is a trialkylsilyl moiety and the polymerization takes place in the presence of a catalytic amount of alkali metal halide salt.

15. The process of claim 1 wherein the difunctional monomers contain a plurality of monomers represented by the Formula:

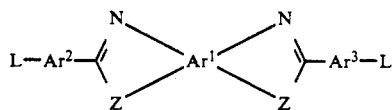

and a plurality of monomers represented by the Formula:

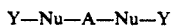

Y—Nu—A—Nu—Y wherein:

Ar$^1$, Ar$^2$ and Ar$^3$ are aromatic groups;

Z is an oxygen atom, a sulfur atom or —NR— wherein R is a hydrogen atom or an alkyl group;

A is a divalent organic moiety that does not interfere with the polymerization reaction;

Nu is a nucleophilic moiety which is an oxygen atom, a sulfur atom or a nitrogen atom having a substituent that does not interfere with the polymerization;

Y is a countermoiety that can dissociate from the nucleophilic moiety;

L is a leaving group that can be displaced from the aromatic group by an anion of the nucleophilic moiety.

16. The process of claim 15 wherein Ar$^1$, Ar$^2$ and Ar$^3$ are each carbocyclic rings containing 6 carbon atoms.

17. The process of claim 15 wherein Z and Nu are each independently an oxygen atom or a sulfur atom.

18. The process of claim 15 wherein A contains an aromatic group.

19. The process of claim 15 wherein Y is a hydrogen atom, an alkali metal ion or a trialkylsilyl moiety.

20. The process of claim 15 wherein L is a halogen atom.

21. The process of claim 15 wherein some the difunctional monomers are represented by the Formula:

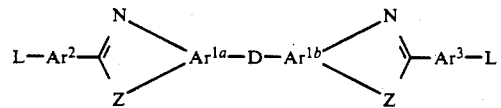

and some of the difunctional monomers are represented by the Formula:

Y—Nu—Ar$^4$—Nu—Y wherein Ar$^{1a}$, Ar$^{1b}$, Ar$^2$ and Ar$^3$ are each carbocyclic aromatic groups containing 6 carbon atoms; Ar$^4$ is an aromatic group containing no more than about 12 carbon atoms; Y is a hydrogen atom, a trialkylsilyl group or an alkali metal cation; L is chlorine or fluorine; Nu is a sulfur atom or an oxygen atom; and Z is a sulfur atom or an oxygen atom.

22. The process of claim 15 wherein the polymerization takes place in an anhydrous organic solvent.

23. The process of claim 22 wherein the polymerization takes place in the presence of a stoichiometric amount of strong base.

24. The process of claim 22 wherein Y is a trialkylsilyl moiety and the polymerization takes place in the presence of a catalytic amount of alkali metal halide salt.

25. The polymer of claim 3 wherein a plurality of repeating units are represented by the Formula:

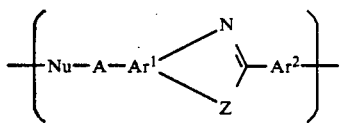

Ar$^1$ and Ar$^2$ are aromatic groups;

Z is an oxygen atom, a sulfur atom or —NR— wherein R is a hydrogen atom or an alkyl group;

A is a bond or a divalent organic moiety that does not interfere with the polymerization reaction; and Nu is a nucleophilic moiety which is an oxygen atom, a sulfur atom or a nitrogen atom having a substituent that does not interfere with the polymerization.

26. The polymer of claim 25 wherein Ar$^1$ and Ar$^2$ are each carbocyclic rings containing 6 carbon atoms.

27. The polymer of claim 25 wherein Z is an oxygen atom or a sulfur atom.

28. The polymer of claim 25 wherein Nu is an oxygen atom or a sulfur atom.

29. The polymer of claim 25 wherein A is a bond.

30. The polymer of claim 3 wherein a plurality of repeating units are represented by either of the Formulae:

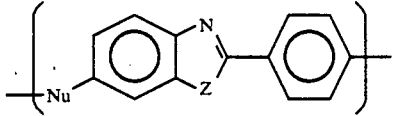

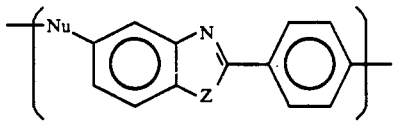

wherein Nu and Z are each independently an oxygen atom or a sulfur atom.

* * * * *